US011042245B2

(12) United States Patent
Chang

(10) Patent No.: US 11,042,245 B2
(45) Date of Patent: Jun. 22, 2021

(54) MUTUAL CAPACITIVE TOUCH PANEL

(71) Applicant: ILI TECHNOLOGY CORP., Hsinchu County (TW)

(72) Inventor: Hu-Chi Chang, Hsinchu County (TW)

(73) Assignee: ILI Technology Holding Corporation, Grand Cayman (KY)

( * ) Notice: Subject to any disclaimer, the term of this patent is extended or adjusted under 35 U.S.C. 154(b) by 179 days.

(21) Appl. No.: 16/214,151

(22) Filed: Dec. 10, 2018

(65) Prior Publication Data

US 2020/0064948 A1 Feb. 27, 2020

(30) Foreign Application Priority Data

Aug. 22, 2018 (TW) .................................. 107129198

(51) Int. Cl.
*G06F 3/044* (2006.01)
(52) U.S. Cl.
CPC .................................... *G06F 3/044* (2013.01)
(58) Field of Classification Search
None
See application file for complete search history.

(56) References Cited

U.S. PATENT DOCUMENTS

| 2011/0175671 A1* | 7/2011 | Reynolds | H03K 17/962 |
| | | | 327/517 |
| 2014/0035833 A1* | 2/2014 | Corsica | G06F 3/041 |
| | | | 345/173 |
| 2016/0018935 A1* | 1/2016 | Wei | H01L 27/1259 |
| | | | 345/173 |
| 2016/0139727 A1* | 5/2016 | Kim | G06F 3/0445 |
| | | | 345/174 |
| 2017/0322662 A1* | 11/2017 | Hsieh | G06F 3/0416 |

FOREIGN PATENT DOCUMENTS

| CN | 103946779 | 7/2014 |
| CN | 104808877 | 7/2015 |
| TW | I1605375 | 11/2017 |
| WO | 2017170224 | 10/2017 |

OTHER PUBLICATIONS

"Office Action of Taiwan Counterpart Application," dated Apr. 11, 2019, p. 1-p. 6.

* cited by examiner

*Primary Examiner* — Parul H Gupta
(74) *Attorney, Agent, or Firm* — JCIPRNET

(57) ABSTRACT

A mutual capacitive touch panel includes a first electrode layer and a second electrode layer. The first electrode layer includes a plurality of first electrode series and a plurality of second electrode series. The second electrode layer includes a plurality of electrode strips, and each electrode strip crosses the first electrode series and the second electrode series. Each first electrode series includes a plurality of first electrodes and a plurality of second electrodes electrically connected with each other, and each first electrode and a corresponding one of the second electrodes are disposed abreast and form an electrode set. Each second electrode series includes a plurality of third electrodes electrically connected with each other, and each electrode set and each third electrode are arranged alternately along a direction.

19 Claims, 11 Drawing Sheets

MUTUAL CAPACITIVE TOUCH PANEL

CROSS-REFERENCE TO RELATED APPLICATION

This application claims the priority benefit of Taiwan application serial no. 107129198, filed on Aug. 22, 2018. The entirety of the above-mentioned patent application is hereby incorporated by reference herein and made a part of this specification.

BACKGROUND

Field of the Invention

The invention relates to a mutual capacitive touch panel and more particularly, to a mutual capacitive touch panel having a dual-layer electrode structure.

Description of Related Art

A touch display device, as being composed of a display and a touch panel, can implement both of a touch function and a display function to feature in human-computer interaction and has been widely applied to electronic products, such as smart phones, GPS navigator systems, tablet PCs and notebook PCs. A mutual capacitive touch panel has advantages, such as high accuracy, multi-touch, high durability and high touch resolution and thus, has become a dominant touch technique in the industry.

The mutual touch technique, in structure design, may mainly be classified into two types, i.e., a single-layer electrode structure and a dual-layer electrode structure. Since the dual-layer electrode structure is simpler than the single-layer electrode structure in the structure design and control algorithm, the dual-layer electrode structure has been commonly applied to middle-to-high-end consumer electronic products. Referring to FIG. 1, it is a schematic top view of a dual-layer electrode structured touch panel with narrow peripheral areas of the related art. In a touch panel 10, driving series of the same column may be divided into two driving series ES, and two adjacent sensing series EL are electrically connected with each other. Thereby, the touch panel 10 has fewer wires connected with the sensing series EL and narrow horizontal peripheral areas at two sides. When the touch panel 10 is manufactured, the sensing series EL are manufactured on a thin film, and the driving series ES are manufactured on another thin film. Thus, the thin film on which the sensing series EL are formed and the thin film on which the driving series ES are formed have to be bonded together through an optical adhesive and then, adhered to a support structure (e.g., a glass substrate) through another optical adhesive.

When the touch panel 10 designed in the aforementioned manner is applied to a bendable display device, as the thin film and the optical adhesive are disposed between the sensing series EL and the driving series ES, an overall thickness may be, for example, 100 μm or more. In this way, when the touch panel 10 is bent, a difference between an outer diameter of the sensing series EL and an inner diameter of the driving series ES (i.e., the touch panel 10 is bent toward the side of the driving series ES) or a difference between an inner diameter of the sensing series EL and an outer diameter of the driving series ES (i.e., the touch panel 10 is bent toward the side of the sensing series EL) may be too large, namely, the sensing series EL and the driving series ES may probably receive an overly large stress, which cause the sensing series EL and the driving series ES to be fractured easily.

Although an insulation thickness between the sensing series EL and the driving series ES may be reduced, for example, by replacing the thin film and the optical film between the two by an insulation layer, a background capacitance between the sensing series EL and the driving series ES is increased as a distance between the sensing series EL and the driving series ES is reduced. As a result, an output of an amplifier for amplifying sensing signals sensed by the sensing series EL may become saturated easily, such that sensing quality of the touch panel is affected.

SUMMARY

According to one of the objectives of the invention, a mutual capacitive touch panel is provided to reduce the background capacitance, so as to improve the touch sensing quality.

According to an embodiment of the invention, a mutual capacitive touch panel including a first electrode layer, a second electrode layer and an insulation layer is provided. The first electrode layer includes a plurality of first electrode series and a plurality of second electrode series respectively extending along a first direction, and each of the first electrode series corresponds to one of the second electrode series. The second electrode layer is disposed above the first electrode layer and includes a plurality of electrode strips respectively extending along a second direction, and each of the electrode strips crosses the first electrode series and the second electrode series. The insulation layer is disposed between the first electrode layer and the second electrode layer. Each of first electrode series includes a plurality of first electrodes and a plurality of second electrodes. In each of the first electrode series, each of the first electrodes is electrically connected to each of the second electrodes, and each first electrode and a corresponding one of the second electrodes are disposed abreast and form an electrode set. Each of the second electrode series includes a plurality of third electrodes electrically connected with each other, each of the electrode sets and each of the third electrodes are arranged alternately along the first direction, and each of the electrode strips overlaps one of the electrode sets and one of the third electrodes that are adjacent to each other in a vertical projection direction.

According to another embodiment of the invention, a mutual capacitive touch panel including a first electrode layer, a second electrode layer and an insulation layer is provided. The first electrode layer includes a plurality of first electrode series and a plurality of second electrode series respectively extending along a first direction, and each of the first electrode series corresponds to one of the second electrode series. Each of the first electrode series includes a plurality of first electrodes and a plurality of first connecting line segments. The first electrodes are electrically connected with each other via the first connecting line segments. Each of the second electrode series includes a plurality of second electrodes and a plurality of second connecting line segments. The second electrodes are electrically connected with each other via the second connecting line segments. The first electrodes and the second electrodes are arranged in an array, and each of the first electrodes of one of the first electrode series and each of the second electrodes of a corresponding one of the second electrode series are arranged alternately along the first direction. The second electrode layer is disposed above the first electrode layer and includes a plurality of meandering electrode strips respectively extending along a second direction. Each of the meandering electrode strips crosses the first electrode series and the second electrode series, and each of the meandering electrode strips overlaps the first electrodes and the second electrodes of two adjacent rows in a vertical projection direction. The insulation layer is disposed between the first electrode layer and the second electrode layer.

In the mutual capacitive touch panel of the invention, since the meandering electrode strips avoid the first connecting line segments and the second connecting line segments, not only the touch accuracy can be prevented from being reduced as the coupling capacitance between the meandering electrode strips and the first and the second connecting line segments is reduced, but also the background capacitance of each sensing unit can be reduced, so as to improve the touch sensing quality. With the abreast disposition of each first electrode and each second electrode and the arrangement that each third connecting line segment connecting the third electrodes is arranged between each first electrode and each second electrode which are disposed abreast, each meandering electrode strip can be prevented from extending to between each first connecting line segment and each second connecting line segment of two adjacent first electrode series, thereby reducing a spacing between the two adjacent first electrode series. Furthermore, with the disposition of each electrode strip in a gap between each electrode set and each third electrode which are adjacent to each other, not only each electrode strip can be designed in a strip shape to reduce an impedance difference between two ends of each electrode strip and prevent sensing signals from being mistakenly determined, but also the coupling capacitance between each electrode strip and each electrode set and between each electrode strip and each third electrode can be reduced, thereby reducing the background capacitance of the mutual capacitive touch panel.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to make the aforementioned and other objects, features and advantages of the present invention more comprehensible, several embodiments accompanied with figures are described in detail below. It should be noted that the accompanying drawings are simplified schematic views. Thus, only elements and combination relationships related to the invention are shown for clearer description of the basic architecture of the invention while actual elements and layouts may be more complicated. In addition, for descriptive convenience, the elements are not proportionally illustrated according to the numbers, shapes and sizes of actually implementation in each accompanying drawing of the invention, and the detail proportions may be adjusted based on design requirements.

Figure 2:
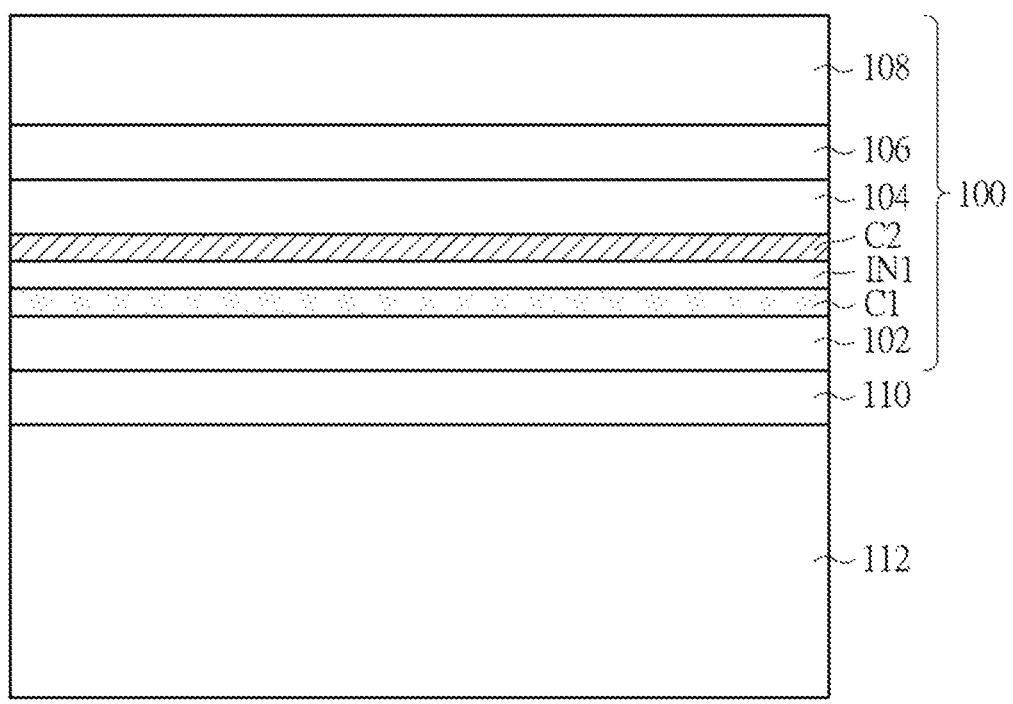
FIG. 2 is a schematic cross-sectional view of a mutual capacitive touch panel according to a first embodiment of the invention.

Referring to FIG. 2, it is a schematic cross-sectional view of a mutual capacitive touch panel according to a first embodiment of the invention. A mutual capacitive touch panel 100 is employed to detect a position touched by a touch object and includes a first electrode layer C1, a second electrode layer C2 and an insulation layer IN1. The insulation layer IN1 is disposed between the first electrode layer C1 and the second electrode layer C2. The first electrode layer C1 and the second electrode layer C2 may be electrically insulated from each other by the insulation layer IN1, and the second electrode layer C2 is closer to the touch object for inputting commands than the first electrode layer C1. The touch object may be, for example, a finger or a stylus. In the present embodiment, the mutual capacitive touch panel 100 may further include a substrate 102, and the second electrode layer C2, the insulation layer IN1 and the first electrode layer C1 are formed sequentially on a first side of the substrate 102, wherein a second side of the substrate 102 is relatively closer to the touch object than the first side. The first electrode layer C1 and the second electrode layer C2 may be respectively formed of a transparent conductive material, wherein the transparent conductive material may include, for example, indium tin oxide (ITO), indium zinc oxide (IZO), antimony tin oxide (ATO), antimony zinc oxide (AZO), nano silver or other suitable transparent conductive materials. The thickness of the first electrode layer C1 and the thickness of the second electrode layer C2 may be, for example, 1 μm or less. The insulation layer IN1 may be formed of an insulation material, and the insulation material may include, for example, silicon oxide, silicon nitride or other suitable insulation materials. The thickness of the insulation layer IN1 may be, for example, 1.2 μm to 30 μm. Since the first electrode layer C1 and the second electrode layer C2 of the present embodiment may respectively contact a top surface and a bottom surface of the insulation layer IN1, the insulation layer IN1 may serve as a dielectric layer for a coupling capacitance between the first electrode layer C1 and the second electrode layer C2. Compared to the dielectric layer composed of the thin film and the optical adhesive in the conventional touch panel, the thickness of the insulation layer IN1 which serves as the dielectric layer in the present embodiment is thinner, and thus, a spacing between the first electrode layer C1 and the second electrode layer C2 may be reduced. When the mutual capacitive touch panel 100 is bent, a difference between an outer diameter of the first electrode layer C1 and an inner diameter of the second electrode layer C2 (i.e., the touch panel is bent toward the second electrode layer C2) or a difference between an inner diameter of the first electrode layer C1 and an outer diameter of the second electrode layer C2 (i.e., the touch panel is bent toward the first electrode layer C1) may be reduced, thereby mitigating a stress received by the first electrode layer C1 and the second electrode layer C2 when the touch panel is bent to further prevent the first electrode layer C1 and the second electrode layer C2 from being fractured. In the present embodiment, the substrate 102 may be, for example, a flexible substrate such as a polyimide (PI) substrate, a polyethylene terephthalate (PET) substrate or a thin glass substrate. In some embodiments, the substrate 210 may also be a rigid substrate such as a glass substrate, a tempered glass substrate, a plastic substrate, a quartz substrate or a sapphire substrate.

In the present embodiment, the mutual capacitive touch panel 100 may further includes a protection layer 104, an adhesive layer 106 and a cover plate 108. The protection layer 104 may be formed on and cover the second electrode layer C2 for protecting the first electrode layer C1, the insulation layer IN1 and the second electrode layer C2, and the adhesive layer 106 is employed to adhere the substrate 102 on which the protection layer 104, the first electrode layer C1, the insulation layer IN1 and the second electrode layer C2 are formed on the cover plate 108. In some embodiments, the mutual capacitive touch panel 100 may further be adhered to a display device 112 through another adhesive layer 110, but the invention is not limited thereto. In another embodiment, the first electrode layer, the insulation layer and the second electrode layer may also be sequentially formed directly on a display surface of a display device, for example, a color filter substrate of a liquid crystal display panel or an encapsulation cover plate of an organic light emitting display panel, and the cover plate may be disposed on the second electrode layer.

Figure 3:
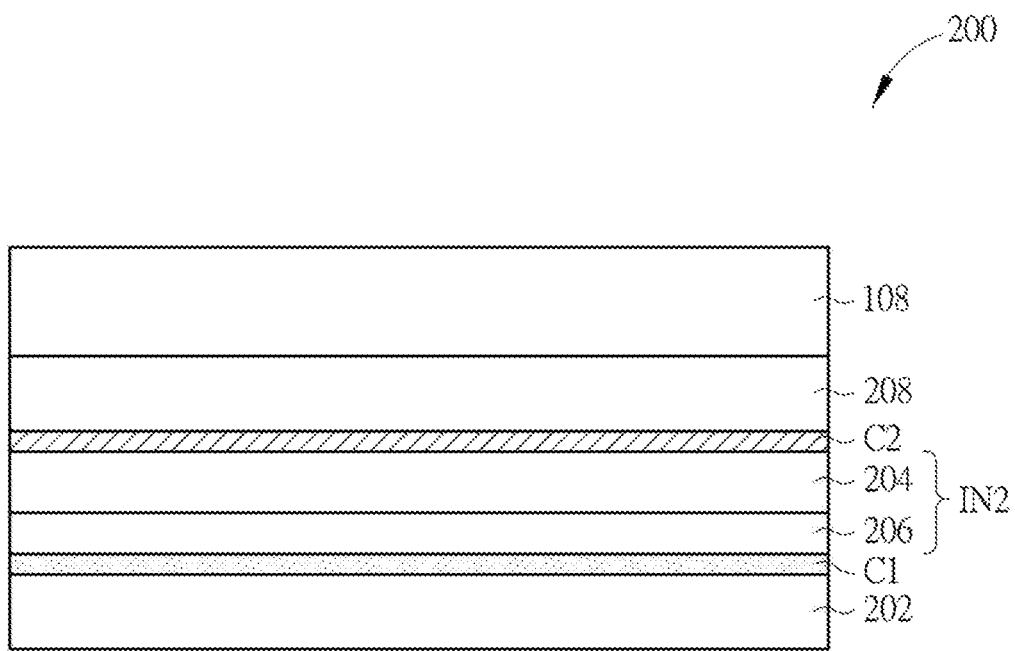
FIG. 3 is a schematic cross-sectional view of a mutual capacitive touch panel according to a second embodiment of the invention.

The stack structure of the mutual capacitive touch panel of the invention is not limited to that described above. Referring to FIG. 3, it is a schematic cross-sectional view of a mutual capacitive touch panel according to a second embodiment of the invention. A mutual capacitive touch panel 200 provided by the present embodiment is different from that of the first embodiment illustrated in FIG. 2 in that the first electrode layer C1 and the second electrode layer C2 of the present embodiment may be respectively formed on substrates 202 and 204, and through two adhesive layers 206 and 208, the substrate 202 on which the first electrode layer C1 is disposed is adhered to the substrate 204 on which the second electrode layer C2 is disposed, and the cover plate 108 is adhered to the substrate 204 on which the second electrode layer C2 is disposed, thereby forming the mutual capacitive touch panel 200. In the present embodiment, the substrate 204 and the adhesive layer 206 between the first electrode layer C1 and the second electrode layer C2 constitute an insulation layer IN2 for insulating the first electrode layer C1 from the second electrode layer C2. The thickness of the adhesive layer 206 may be, for example, substantially 20 µm, and the thickness of the substrate 204 may be, for example, substantially 25 µm.

Figure 4:
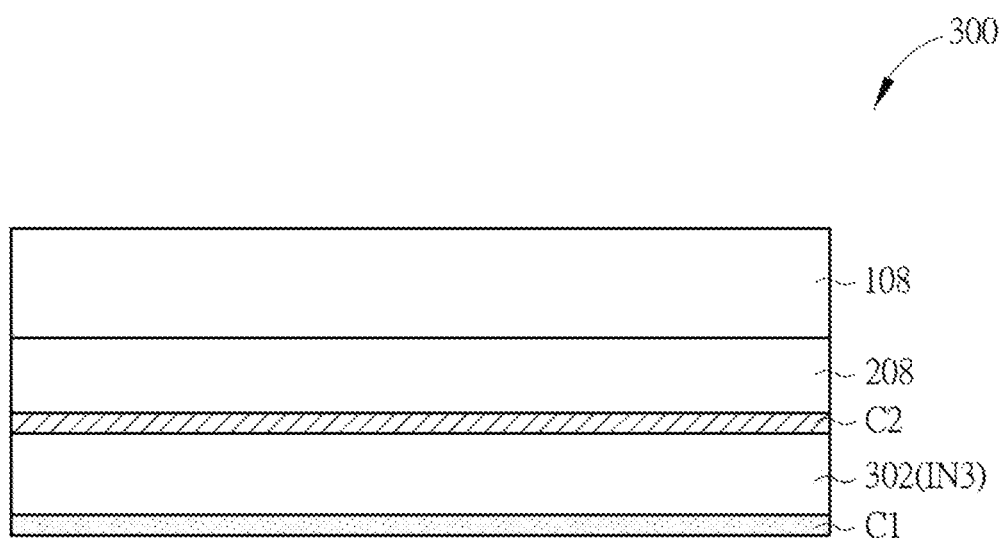
FIG. 4 is a schematic cross-sectional view of a mutual capacitive touch panel according to a third embodiment of the invention.

Referring to FIG. 4, it is a schematic cross-sectional view of a mutual capacitive touch panel according to a third embodiment of the invention. A mutual capacitive touch panel 300 provided by the present embodiment is different from that of the second embodiment illustrated in FIG. 3 in that the first electrode layer C1 and the second electrode layer C2 of the present embodiment may be respectively formed on a top surface and a bottom surface of a same substrate 302. That is to say, the substrate 302 may constitute an insulation layer IN3 which insulates the first electrode layer C1 from the second electrode layer C2.

Figure 5:
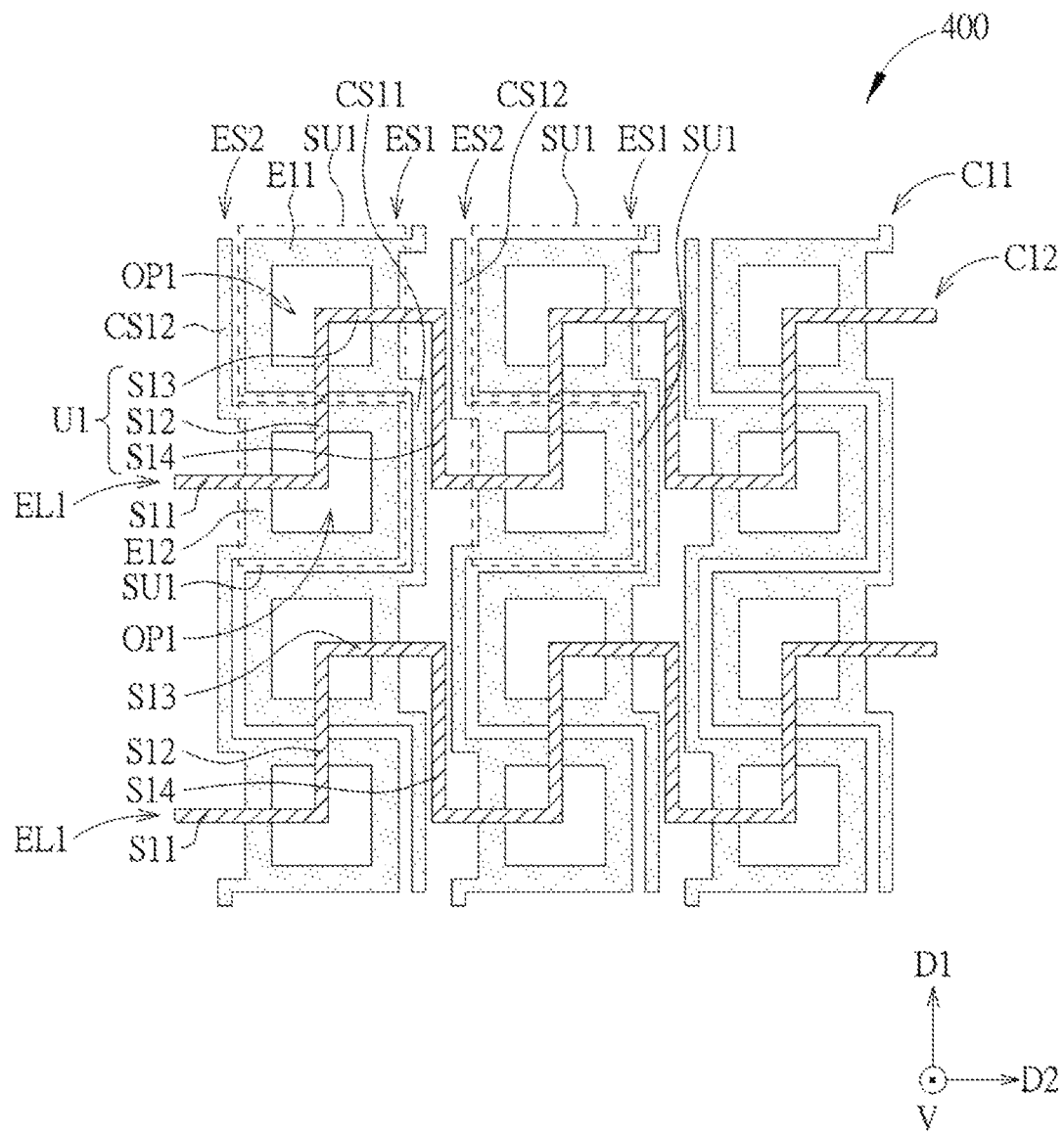
FIG. 5 is a schematic top view of a mutual capacitive touch panel according to a fourth embodiment of the invention.

The aforementioned each embodiment uses a stack structure in which the insulation layer between the first electrode layer C1 and the second electrode layer C2 is thinner and thus, certainly has a greater background capacitance, such that it is necessary to redesign a shape of first electrodes of the first electrode layer and a shape of second electrodes of the second electrode layer, and top-view designs of the mutual capacitive touch panel of the invention will be further described below. Referring to FIG. 5, it is a schematic top view of a mutual capacitive touch panel according to a fourth embodiment of the invention. In a mutual capacitive touch panel 400 provided by the present embodiment, a first electrode layer C11 includes a plurality of first electrode series ES1 which are separated and insulated from each other and a plurality of second electrode series ES2 which are separated and insulated from each other, wherein the first electrode series ES1 and the second electrode series ES2 respectively extend along a first direction D1, and a second electrode layer C12 includes a plurality of meandering electrode strips EL1 respectively extending meanderingly along a second direction D2 and crossing the first electrode series ES1 and the second electrode series ES2. A plurality of sensing units SU1 arranged in an array may be formed by the meandering electrode strips EL1 crossing the first electrode series ES1 and the second electrode series ES2 for detecting a position of the touch object. Each first electrode series ES1 corresponds to one of the second electrode series ES2, such that the corresponding first electrode series ES1 and second electrode series ES2 may be employed to form the sensing units SU1 on the same column.

In the present embodiment, each first electrode series ES1 includes a plurality of first electrodes E11 and a plurality of first connecting line segments CS11, and each second electrode series ES2 includes a plurality of second electrodes E12 and a plurality of second connecting line segments CS12. Additionally, the first electrodes E11 and the second electrodes E12 are arranged in an array, the first electrodes E11 are located in odd rows, and the second electrodes E12 are located in even rows. Thus, on each column of the array, each first electrode E11 and each second electrode E12 are alternately arranged in sequence. Meanwhile, the first electrodes E11 on the same column are connected in series via the first connecting line segments CS11 to form one of the first electrode series ES1, and the second electrodes E12 on the same column are connected in series via the second connecting line segments CS12 to form one of the second electrode series ES2. In the present embodiment, a column direction of the array may be the first direction D1, a row direction of the array may be the second direction D2, but the invention is not limited thereto.

In the present embodiment, the first connecting line segments CS11 and the second connecting line segments CS12 corresponding to the first electrodes E11 and the second electrodes E12 on the same column are respectively disposed at two sides of the first electrodes E11 and the second electrodes E12 on the same column, which may be respectively disposed at the left side and the right side or contrariwise, for example. Thereby, the first connecting line segments CS11 may be staggered from the second connecting line segments CS12, such that the first connecting line segments CS11 electrically connected with the first electrodes E11 on the same column and the second connecting line segments CS12 electrically connected with the second electrodes E12 on the same column may be formed in the same first electrode layer C11, and the first electrode series ES1 and the second electrode series ES2 of the first electrode layer C11 may be insulated from each other.

In addition, even though each meandering electrode strip EL1 of the second electrode layer C12 extends along the second direction D2 and crosses the first electrode series ES1 and the second electrode series ES2, each meandering electrode strip EL1 overlaps the first electrodes E11 and the second electrodes E12 of two adjacent rows in a vertical projection direction V by means of avoiding the first connecting line segments CS11 and the second connecting line segments CS12, such that each meandering electrode strip EL1 may be coupled to one of the first electrodes E11 and one of the second electrodes E12 that are adjacent to each other to form two sensing units SU1 arranged in the first direction D1, wherein the vertical projection direction V may be, for example, a direction vertical to a surface of the substrate on which the first electrode layer C11 is disposed. In other words, each meandering electrode strip EL1 does not overlap the first connecting line segments CS11 and the second connecting line segments CS12 in the vertical projection direction V. As the mutual capacitive touch panel 400 does not have any coupling capacitance additionally generated between the each electrode strip and the first connecting line segments CS11 and between the each electrode strip and the second connecting line segments CS12 in the vertical projection direction V, the touch accuracy may be prevented from being reduced due to errors in determination. By reducing the coupling capacitance between each meandering electrode strip EL1 and the first connecting line segments CS11 and between each meandering electrode strip EL1 and the second connecting line segments CS12, a background capacitance of each sensing unit SU1 of the mutual capacitive touch panel 400 may be reduced.

Specifically, each meandering electrode strip EL1 may include a plurality of first sections S11, a plurality of second sections S12, a plurality of third sections S13 and a plurality of fourth sections S14 which are alternately connected in sequence. In each meandering electrode strip EL1, the first section S11 extends from a side (e.g., the left side) of the first electrode E11 and the second electrode E12 on the same column to overlap the second electrode E12. Since the first section S11 extends from between two adjacent second connecting line segments CS12 to overlap the second electrode E12, each meandering electrode strip EL1 may be kept away from the second connecting line segments CS12. The second section S12 connected to the first section S11 overlaps the second electrode E12 and extends to overlap the first electrode E11 adjacent to the second electrode E12. The first section S11 and the second section S12 may be coupled to the corresponding second electrode E12 to form a sensing unit SU1. The third section S13 connected to the second section S12 overlaps the first electrode E11 and extends to the other side (e.g., the right side) of the first electrode E11 and the second electrode E12 on the same column. The second section S12 and the third section S13 may be coupled to the corresponding first electrode E12 to form another sensing unit SU1. The fourth section S14 connected to the third section S13 extends to between the adjacent first connecting line segment CS11 and second connecting line segment CS12 corresponding to different columns. With a U-shaped section U1 composed of the second section S12, the third section S13 and the fourth section S14, each meandering electrode strip EL1 may be kept away from the second connecting line segments CS12. In the present embodiment, each first section S11 and each third section S13 extend in parallel to the second direction D2, and each second section S12 and each fourth section S14 extend in parallel to the first direction D1, but the invention is not limited thereto.

In the present embodiment, each first electrode E11 may selectively include an opening OP1 and so does each second electrode E12, such that an overlapping area of each meandering electrode strip EL1 and each first electrode E11 and an overlapping area of each meandering electrode strip EL1 and each second electrode E12 in the vertical projection direction V may be reduced, so as to reduce the background capacitance of each sensing unit SU1 of the mutual capacitive touch panel 400. In another embodiment, the first electrodes and the second electrodes may not be provided with the openings. In addition, the stack structure of the first electrode layer C11, the insulation layer and the second electrode layer C12 may be applied to any one of the first embodiment illustrated in FIG. 2, the second embodiment illustrated in FIG. 3 and the third embodiment illustrated in FIG. 4.

Figure 6:
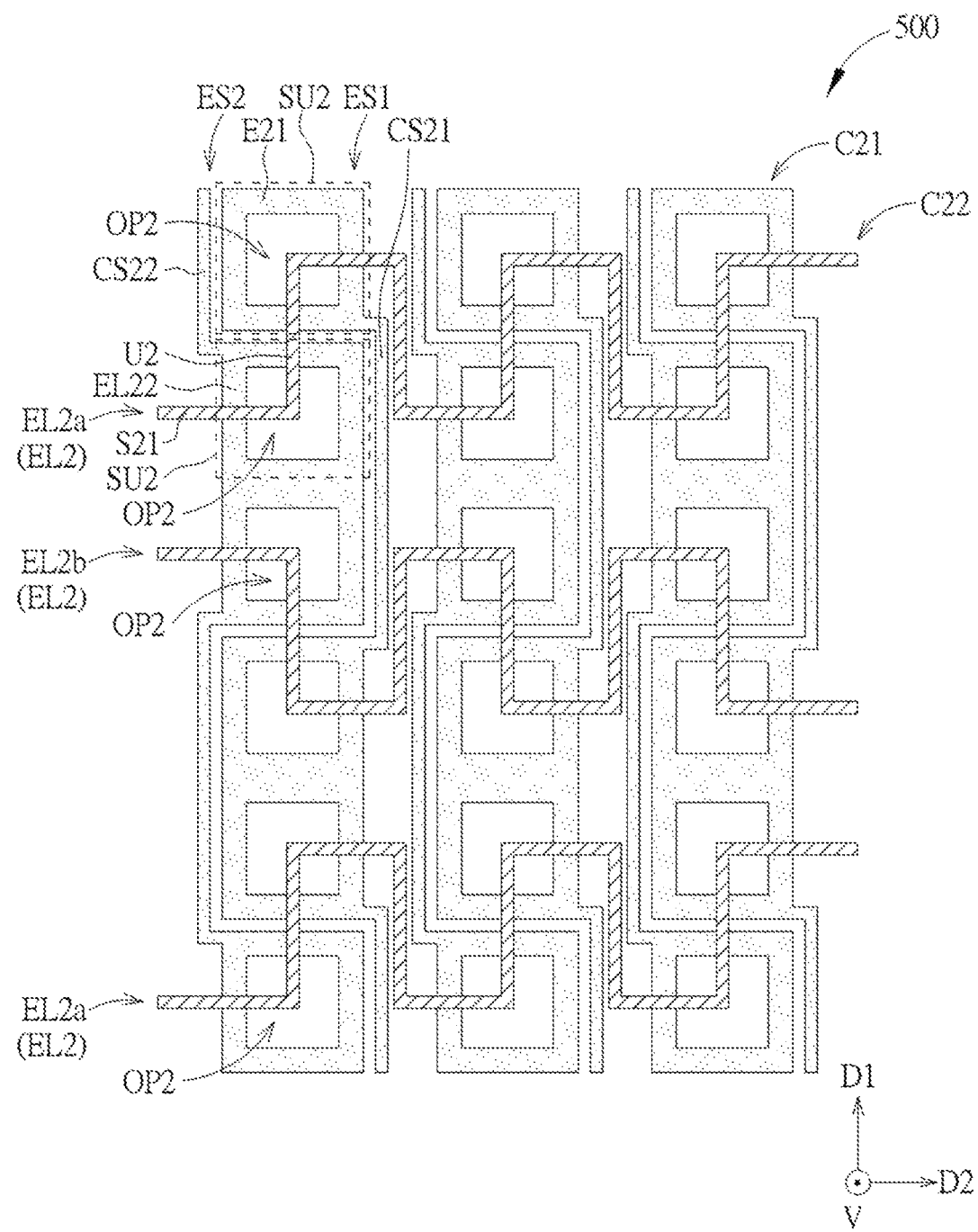
FIG. 6 is a schematic top view of a mutual capacitive touch panel according to a fifth embodiment of the invention.

Referring to FIG. 6, it is a schematic top view of a mutual capacitive touch panel according to a fifth embodiment of the invention. A mutual capacitive touch panel 500 provided by the present embodiment is different from that of the fourth embodiment illustrated in FIG. 5 in that first electrodes E21 of the same row of the present embodiment overlap two adjacent meandering electrode strips EL2, second electrodes E22 of the same row also overlap two adjacent meandering electrode strips EL2, and each meandering electrode strip EL2 overlaps the first electrodes E21 and the second electrodes E22 of two adjacent rows, thereby improving the touch accuracy in the column direction (e.g., the first direction D1). Specifically, the meandering electrode strips EL2 may include a plurality of first meandering electrode strips EL2*a* and a plurality of second meandering electrode strips EL2*b*. Each first meandering electrode strip EL2*a* and each second meandering electrode strip EL2*b* are alternately arranged along the first direction D1, and the adjacent first meandering electrode strip EL2*a* and second meandering electrode strip EL2*b* are symmetrical to each other with respect to the second direction D2. Each first meandering electrode strip EL2*a* includes a plurality of first sections S21 and a plurality of U-shaped sections U2 alternately connected to each other, and so does each second meandering electrode strip EL2*b*. The first sections S1 of the adjacent first meandering electrode strip EL2*a* and second meandering electrode strip EL2*b* respectively extend from a side (e.g., the left side) of the first electrodes E21 and the second electrodes E22 on the same column to overlap the same second electrode E22, and the U-shaped sections U2 of the adjacent first meandering electrode strip EL2*a* and second meandering electrode strip EL2*b* are symmetrical to each other with respect to the second direction D2 and respectively extend to overlap two different first electrodes E21 adjacent to the second electrode E22, extend to the other side (e.g., the right side) of the first electrodes E21 and the second electrodes E22 on the same column and extend to between first connecting line segments CS21 and second connecting line segments CS22 corresponding to different columns. That is to say, with the U-shaped sections U2 that are symmetrical to each other, the first meandering electrode strips EL2a and the second meandering electrode strips EL2b overlapping the second electrodes E22 on the same column may avoid the first connecting line segments CS21, thereby reducing a background capacitance of each sensing unit SU2 of the mutual capacitive touch panel 500.

In the present embodiment, even though the first electrodes E21 and the second electrodes E22 are still arranged in an array, the width of each first electrode E21 of a first row in the first direction D1 is smaller than the width of each first electrode E21 of the other rows in the first direction D1, such that the first electrodes E21 of the first row overlap only one first meandering electrode strip EL2a, and the first electrodes E21 of the other rows overlap the adjacent first meandering electrode strip EL2a and second meandering electrode strip EL2b. The width of each second electrode E22 of a last row in the first direction D1 is smaller than the width of each second electrode E22 of the other rows in the first direction D1, such that the second electrodes E22 of the last row overlap only one first meandering electrode strip EL2a, and the second electrodes E22 of the other rows overlap the adjacent first meandering electrode strip EL2a and second meandering electrode strip EL2b. In the present embodiment, each first electrode E21 of the first row may be coupled to the corresponding first meandering electrode strip EL2a to form a sensing unit SU2, each second electrode E22 of the last row may be coupled to the corresponding first meandering electrode strip EL2a to form a sensing unit SU2, each first electrode E21 of the other rows may be coupled to the corresponding first meandering electrode strip EL2a and second meandering electrode strip EL2b to form two sensing units SU2, and each second electrode E22 of the other rows may be coupled to the corresponding first meandering electrode strip EL2a and second meandering electrode strip EL2b to form two sensing units SU2.

In the present embodiment, each first electrode E21 may selectively include an opening OP2, and so does each second electrode E22, thereby reducing an overlapping area of each meandering electrode strip EL2 and each electrode series to further reduce the background capacitance. Specifically, each first electrode E21 of the first row may have an opening OP2 overlapping the corresponding first meandering electrode strip EL2a, each second electrode E22 of the last row may have an opening OP2 overlapping the corresponding first meandering electrode strip EL2a. Each first electrode E21 of the other rows may have two openings OP2 respectively overlapping the corresponding first meandering electrode strip EL2a and second meandering electrode strip EL2b, and each second electrode E22 of the other rows may have two openings OP2 respectively overlapping the corresponding first meandering electrode strip EL2a and second meandering electrode strip EL2b. With the disposition of the openings OP2, an overlapping area of each meandering electrode strip EL2 and each first electrode E21 and an overlapping area of each meandering electrode strip EL2 and each second electrode E22 in the vertical projection direction V may be reduced, thereby reducing a background capacitance of the mutual capacitive touch panel 500. In another embodiment, the first electrodes and the second electrodes may not be provided with the openings. The stack structure of the first electrode layer C21, the insulation layer and the second electrode layer C22 may be applied to any one of the first embodiment illustrated in FIG. 2, the second embodiment illustrated in FIG. 3 and the third embodiment illustrated in FIG. 4.

Figure 7:
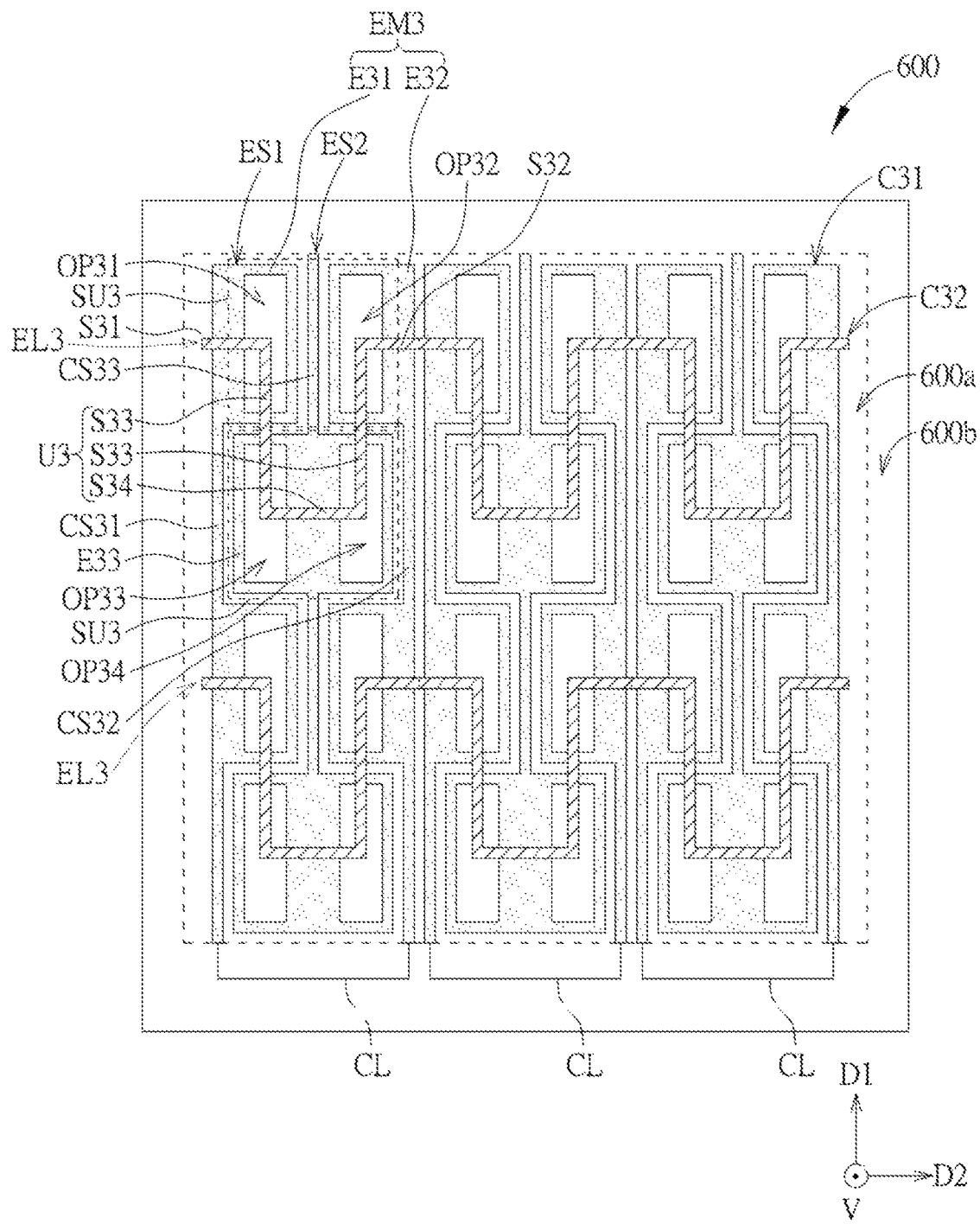
FIG. 7 is a schematic top view of a mutual capacitive touch panel according to a sixth embodiment of the invention.

Referring to FIG. 7, it is a schematic top view of a mutual capacitive touch panel according to a sixth embodiment of the invention. In a mutual capacitive touch panel 600 provided by the present embodiment, a first electrode layer C31 includes a plurality of first electrode series ES1 and a plurality of second electrode series ES2 respectively extending along the first direction D1, and each first electrode series ES1 corresponds to one of the second electrode series ES2. Each first electrode series ES1 includes a plurality of first electrodes E31 and a plurality of second electrodes E32 which are disposed in a touch area 600a of the mutual capacitive touch panel 600. In each of the first electrode series ES1, each first electrode E31 is electrically connected to each second electrode E32, and each first electrode E31 and its corresponding second electrode E32 are disposed abreast and form an electrode set EM3. Each of the second electrode series ES2 includes a plurality of third electrodes E33 electrically connected with each other and disposed in the touch area 600a of the mutual capacitive touch panel 600. In the first electrode series ES1 and the second electrode series ES2 that corresponding to each other, each electrode set EM3 and each third electrode E33 are arranged alternately along the first direction D1. That is to say, the electrode sets EM3 and the third electrodes E33 are arranged in an array, wherein the electrode sets EM3 are located in odd rows, and the third electrodes E33 are located in even rows. Specifically, each first electrode series ES1 further includes a plurality of first connecting line segments CS31 and a plurality of second connecting line segments CS32 which are disposed in the touch area 600a of the mutual capacitive touch panel 600. Each first connecting line segment CS31 is connected between two adjacent first electrodes E31 for electrically connecting the first electrodes E31 belonging to the same first electrode series ES1 with each other to form a sub series, and each second connecting line segment CS32 is connected between two adjacent second electrodes E32 for electrically connecting the second electrodes E32 belonging to the same second electrode series ES2 with each other to form another sub series. Each second electrode series ES2 further includes a plurality of third connecting line segments CS33 which are disposed in the touch area 600a of the mutual capacitive touch panel 600, each third connecting line segment CS33 is connected between two adjacent third electrodes E33 and arranged between the first electrode E31 and the second electrode E32 which are disposed abreast. In other words, each third connecting line segment CS33 passes through each electrode set EM3 for electrically connecting the third electrodes E33 belonging to each second electrode series ES2 with each other. In order to separate the first connecting line segments CS32, the second connecting line segments CS32 and the third connecting line segments CS32 from one another to be formed by the same first electrode layer C31, the first connecting line segment CS31 and the second connecting line segment CS32 of each first electrode series ES1 are respectively disposed at two opposite sides of the corresponding second electrode series ES2, thus, two sub series of each first electrode series ES1 are respectively disposed at two opposite sides of the corresponding second electrode series ES2.

In order to electrically connect the two sub series of each first electrode series ES1 with each other, each first electrode series ES1 further includes at least one connecting line CL disposed on at least one end of the second electrode series ES2. The first connecting line segment CS31 and the second connecting line segment CS32 of each first electrode series ES1 which are adjacent to one end of each second electrode series ES2 may be electrically connected with each other via the connection line CL, and thereby, the first electrodes E31 of the sub series located at one side (the left side) of the second electrode series ES2 may be electrically connected with the second electrodes E32 of the sub series located at the other side (the right side) of the second electrode series ES2. In the present embodiment, the connecting lines CL may be disposed in a peripheral area 600b of the mutual capacitive touch panel 600, and the connecting lines CL may be formed by the first electrode layer C31 for forming the first electrode series ES1 or formed by a conductive layer which is different from the first electrode layer C31.

The second electrode layer C32 of the present embodiment includes a plurality of meandering electrode strips EL3, and a plurality of sensing units SU3 arranged in an array may be formed by each meandering electrode strip EL3 crossing the first electrode series ES1 and the second electrode series ES2. Specifically, each meandering electrode strip EL3 may include a plurality of first sections S31, a plurality of second sections S32 and a plurality of U-shaped sections U3, wherein each first section S31, each U-shaped section U3 and each second section S32 are arranged alternately in sequence. In other words, the first section S31 and the second section S32 are respectively connected to two ends of the same U-shaped section U3. In each meandering electrode strip EL3, the first section S31 extends from a side (e.g., the left side) of the electrode set EM3 of the first electrode series ES1 to overlap one of the first electrodes E31. The U-shaped section U3 connected to the first section S31 overlaps the first electrode E31, extends to overlap the third electrode E33 adjacent to the first electrode E31 and further extends to overlap the second electrode E32 disposed abreast with the first electrode E31. Thus, the U-shaped section U3 may overlap the adjacent electrode set EM3 and third electrode E33, without overlapping the third connecting line segment CS33. The second section S32 connected to the U-shaped section U3 overlaps the second electrode E32 and extends to the other side (e.g., the right side) of the electrode set EM3 of the first electrode series ES1. The first section S31, a part of the U-shaped section U3 and the second section S32 may be coupled to the corresponding electrode set EM3 to form a sensing unit SU3, and another part of the U-shaped section U3 may be coupled to the corresponding third electrode E33 to form another sensing unit SU3. With such disposition, each meandering electrode strip EL3 may avoid the first connecting line segments CS31, the second connecting line segments CS32 and the third connecting line segments CS33, without overlapping the first connecting line segments CS31, the second connecting line segments CS32 and the third connecting line segments CS33. In this way, the coupling capacitance between each meandering electrode strip EL3 and each first connecting line segment CS31, between each meandering electrode strip EL3 and each second connecting line segment CS32 and between each meandering electrode strip EL3 and each third connecting line segment CS33 may be reduced, thereby reducing a background capacitance of the mutual capacitive touch panel 600. In the present embodiment, each U-shaped section U3 may include two third sections S33 disposed along the first direction D1 and a fourth section S34 disposed along the second direction D2, and the third sections S33 are respectively connected to two ends of the fourth section S34. In addition, each first section S31 and each second section S32 extend in parallel to the second direction D2, but the invention is not limited thereto.

It is to be mentioned that according to the mutual capacitive touch panel 400 of the fourth embodiment illustrated in FIG. 5 and the mutual capacitive touch panel 500 of the fifth embodiment illustrated in FIG. 6, since the fourth section has to be disposed between the first connecting line segment and the second connecting line segment corresponding to different columns and adjacent to each other, a gap between two adjacent columns must have a specific width to reduce the coupling capacitance between the fourth section and the first connecting line segment and between the fourth section and the second connecting line segment. However, in the mutual capacitive touch panel 600 provided by the present embodiment, since the third connecting line segment CS33 is located between the first electrode E31 and the second electrode E32 which are disposed abreast, the U-shaped section U3 of each meandering electrode strip EL3 may be designed to overlap the adjacent electrode set EM3 and third electrode E33. In this way, the meandering electrode strip EL3 does not have to extend to between the adjacent first connecting line segment CS31 and second connecting line segment CS32 in two adjacent first electrode series ES1, such that a spacing between the two adjacent first electrode series ES1 may be reduced.

In addition, each first electrode E31 may selectively include a first opening OP31, each second electrode E32 may selectively include a second opening OP32, and each third electrode E33 may selectively a third opening OP33 and a fourth opening OP34 disposed abreast in the second direction D2. Each first opening OP31 and each third opening OP33 are arranged alternately along the first direction D1, and each second opening OP32 and each fourth opening OP34 are arranged alternately along the first direction D1. With the disposition of the openings, an overlapping area of each meandering electrode strip EL3 and each first electrode E31, an overlapping area of each meandering electrode strip EL3 and each second electrode E32 and an overlapping area of each meandering electrode strip EL3 and each third electrode E33 in the vertical projection direction V may be reduced, thereby reducing the background capacitance of the mutual capacitive touch panel 600. In another embodiment, each first electrode, each second electrode and each third electrode may not be provided with the openings. The stack structure of the first electrode layer C31, the insulation layer and the second electrode layer C32 may be applied to any one of the first embodiment illustrated in FIG. 2, the second embodiment illustrated in FIG. 3 and the third embodiment illustrated in FIG. 4.

Figure 8:
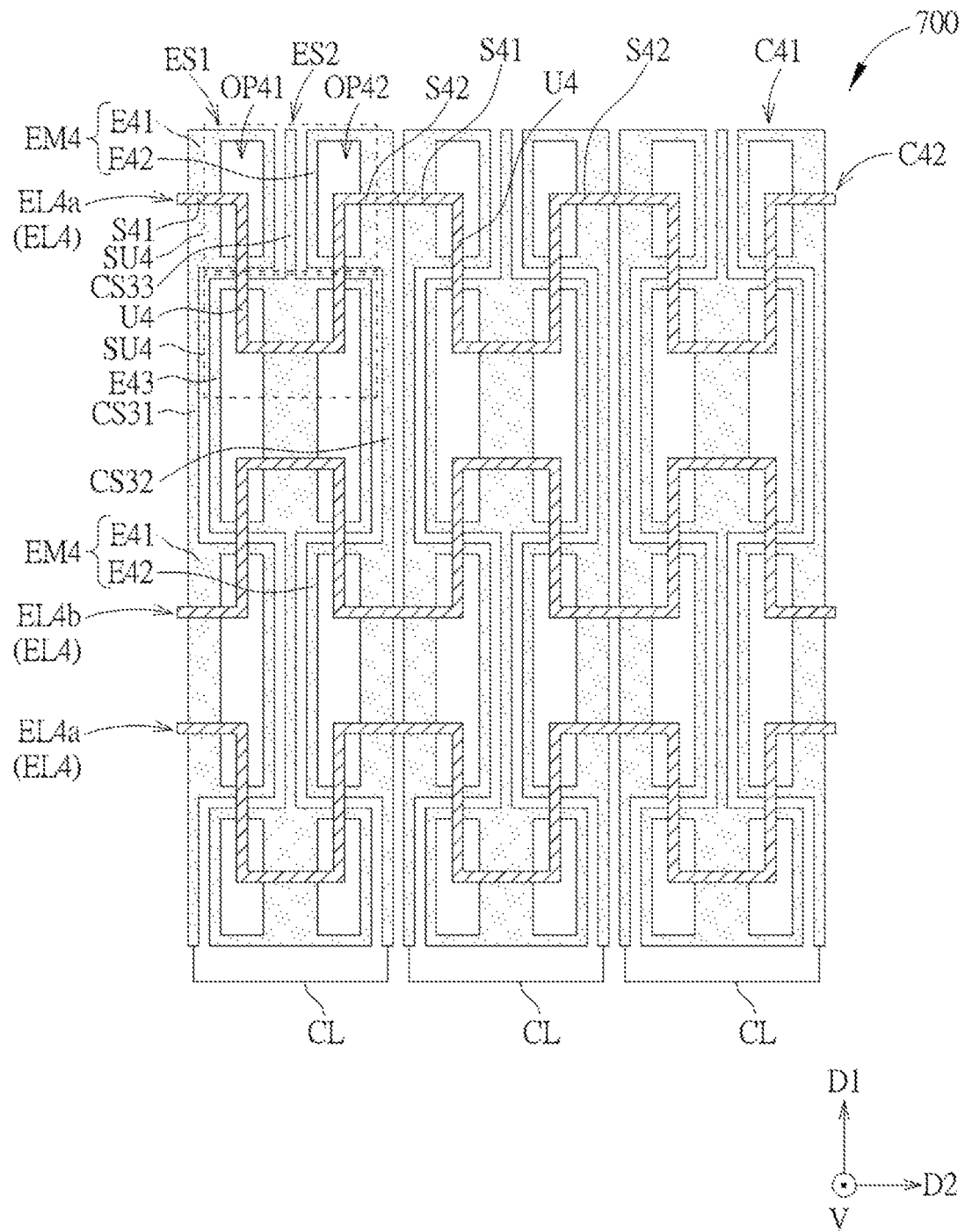
FIG. 8 is a schematic top view of a mutual capacitive touch panel according to a seventh embodiment of the invention.

Referring to FIG. 8, it is a schematic top view of a mutual capacitive touch panel according to a seventh embodiment of the invention. A mutual capacitive touch panel 700 provided by the present embodiment is different from that of the sixth embodiment illustrated in FIG. 7 in that in the present embodiment, electrode sets EM4 of the same row overlap two adjacent meandering electrode strips EL4, third electrodes E43 of the same row also overlap two adjacent meandering electrode strips EL4, and each meandering electrode strip EL4 overlaps the electrode sets EM4 and the third electrodes E43 of two adjacent rows, thereby improving touch accuracy in the column direction (e.g., the first direction D1). In the present embodiment, each meandering electrode strip EL4 may be coupled to a part of one of the electrode sets EM4 and coupled to a part of one of the third electrodes E43 to form two sensing units SU4. Specifically, each meandering electrode strip EL4 may include a plurality of first meandering electrode strips EL4a and a plurality of second meandering electrode strips EL4b, each first meandering electrode strip EL4a and each second meandering electrode strip EL4b are alternately arranged along the first direction D1, and the first meandering electrode strip EL4a and the second meandering electrode strip EL4b that are adjacent to each other are symmetrical to each other with respect to the second direction D2. Each first meandering electrode strip EL4a includes a plurality of first sections S41, a plurality of second sections S42 and a plurality of U-shaped sections U4 sequentially connected with each other alternately and so does each second meandering electrode strip EL4b. The first section S41 of each first meandering electrode strip EL4a and the first section S41 of each second meandering electrode strip EL4b extend from a side (e.g., the left side) of the corresponding first electrode series ES1 to respectively overlap different first electrodes E41, the U-shaped section U4 of each first meandering electrode strip EL4a and the U-shaped section U4 of each second meandering electrode strip EL4b respectively overlap the corresponding first electrodes E41, extend to overlap the corresponding third electrode E43 and further extend to overlap the corresponding second electrodes E42, and the second section S42 of each first meandering electrode strip EL4a and the second section S42 of each second meandering electrode strip EL4b respectively overlap the corresponding second electrodes E42 and extends to the other side (e.g., the right side) of the first electrode series ES1. In addition, the U-shaped sections U4 of the adjacent first meandering electrode strip EL4a and second meandering electrode strip EL4b corresponding to the same second electrode series ES2 overlap the same third electrode E43, and overlap different electrode sets EM4.

In the present embodiment, even though the electrode sets EM4 and the third electrodes E43 are arranged in an array, widths of each first electrode E41 and each second electrode E42 of a first row in the first direction D1 are smaller than widths of each first electrode E41 and each second electrode E42 of the other rows in the first direction D1 and thus, the electrode sets EM4 of the first row overlap only one first meandering electrode strip EL4a, the electrode sets EM4 of the other rows overlap the adjacent first meandering electrode strip EL4a and second meandering electrode strip EL4b, and the width of each third electrode E43 of a last row in the first direction D1 is smaller than the width of each third electrode E43 of the other rows in the first direction D1, such that the third electrodes E43 of the last row overlap only one first meandering electrode strip EL4a, and the third electrodes E43 on the other rows overlap the adjacent first meandering electrode strip EL4a and second meandering electrode strip EL4b. In the present embodiment, each electrode set EM4 of the first row may be coupled to the corresponding first meandering electrode strip EL4a to form a sensing unit SU4, each third electrode E43 of the last row may be coupled to the corresponding first meandering electrode strip EL4a to form a sensing unit SU4, each electrode set EM4 of the other rows may be coupled to the corresponding first meandering electrode strip EL4a and second meandering electrode strip EL4b to form two sensing units SU4, and each third electrode E43 of the other rows may be coupled to the corresponding first meandering electrode strip EL4a and second meandering electrode strip EL4b to form two sensing units SU4.

Widths of each first opening OP41 and each second opening OP42 of the first row in the first direction D1 are also smaller than widths of each first opening OP41 and each second opening OP42 of the other rows in the first direction D1, and each first opening OP41 and each second opening OP42 of the other rows overlap the adjacent first meandering electrode strip EL4a and second meandering electrode strip EL4b. Widths of each third opening OP43 and each fourth opening OP44 of the last row in the first direction D1 are also smaller than widths of each third opening OP43 and each fourth opening OP44 of the other rows in the first direction D1, such that each third opening OP43 and each fourth opening OP44 of the other rows overlap the adjacent first meandering electrode strip EL4a and second meandering electrode strip EL4b. In another embodiment, each first electrode, each second electrode and each third electrode may not be provided with the openings. The stack structure of the first electrode layer C41, the insulation layer and the second electrode layer C42 may be applied to any one of the first embodiment illustrated in FIG. 2, the second embodiment illustrated in FIG. 3 and the third embodiment illustrated in FIG. 4.

Figure 9:
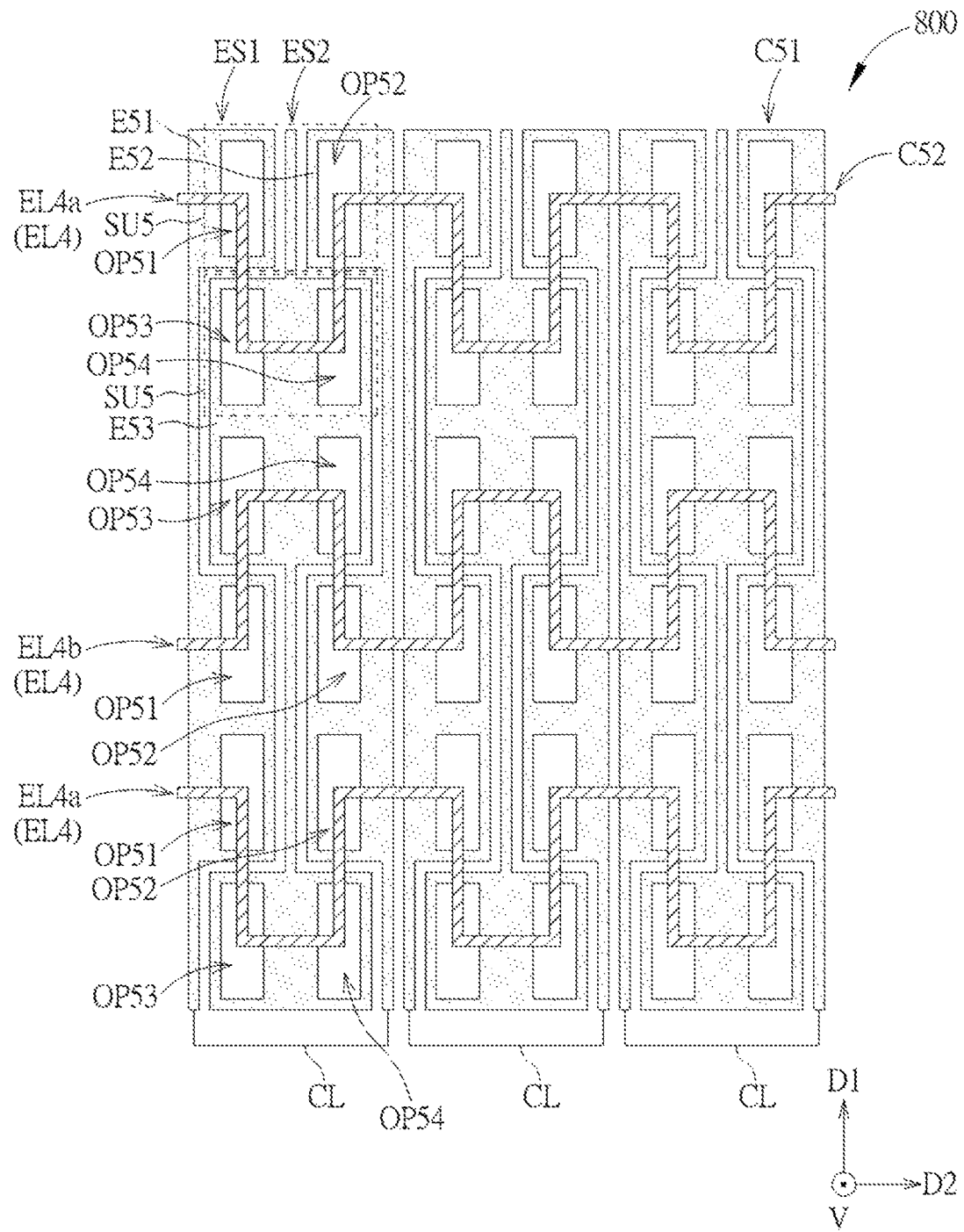
FIG. 9 is a schematic top view of a mutual capacitive touch panel according to an eighth embodiment of the invention.

Referring to FIG. 9, it is a schematic top view of a mutual capacitive touch panel according to an eighth embodiment of the invention. A mutual capacitive touch panel 800 provided by the present embodiment is different from that of the seventh embodiment illustrated in FIG. 8 in that in a first electrode layer C51 of the present embodiment, each first electrode E51 of a non-first row may include two first openings OP51, each second electrode E52 of the non-first row may include two second openings OP52, and each third electrode E53 of a non-last row may include two third openings OP53 and two fourth openings OP54, wherein the third openings OP53 and the fourth openings OP54 are separated from each other. Except for the first electrodes E51 and the second electrodes E52 of the first row and the third electrodes E53 of the last row, each two first openings OP51 and each two third openings OP53 are arranged alternately along the first direction D1, and each two second openings OP52 and each two fourth openings OP54 are arranged alternately along the first direction D1. In other words, each sensing unit SU5 of the present embodiment includes two openings which are disposed abreast. The stack structure of the first electrode layer C51, the insulation layer and the second electrode layer C52 may be applied to any one of the first embodiment illustrated in FIG. 2, the second embodiment illustrated in FIG. 3 and the third embodiment illustrated in FIG. 4.

Figure 10:
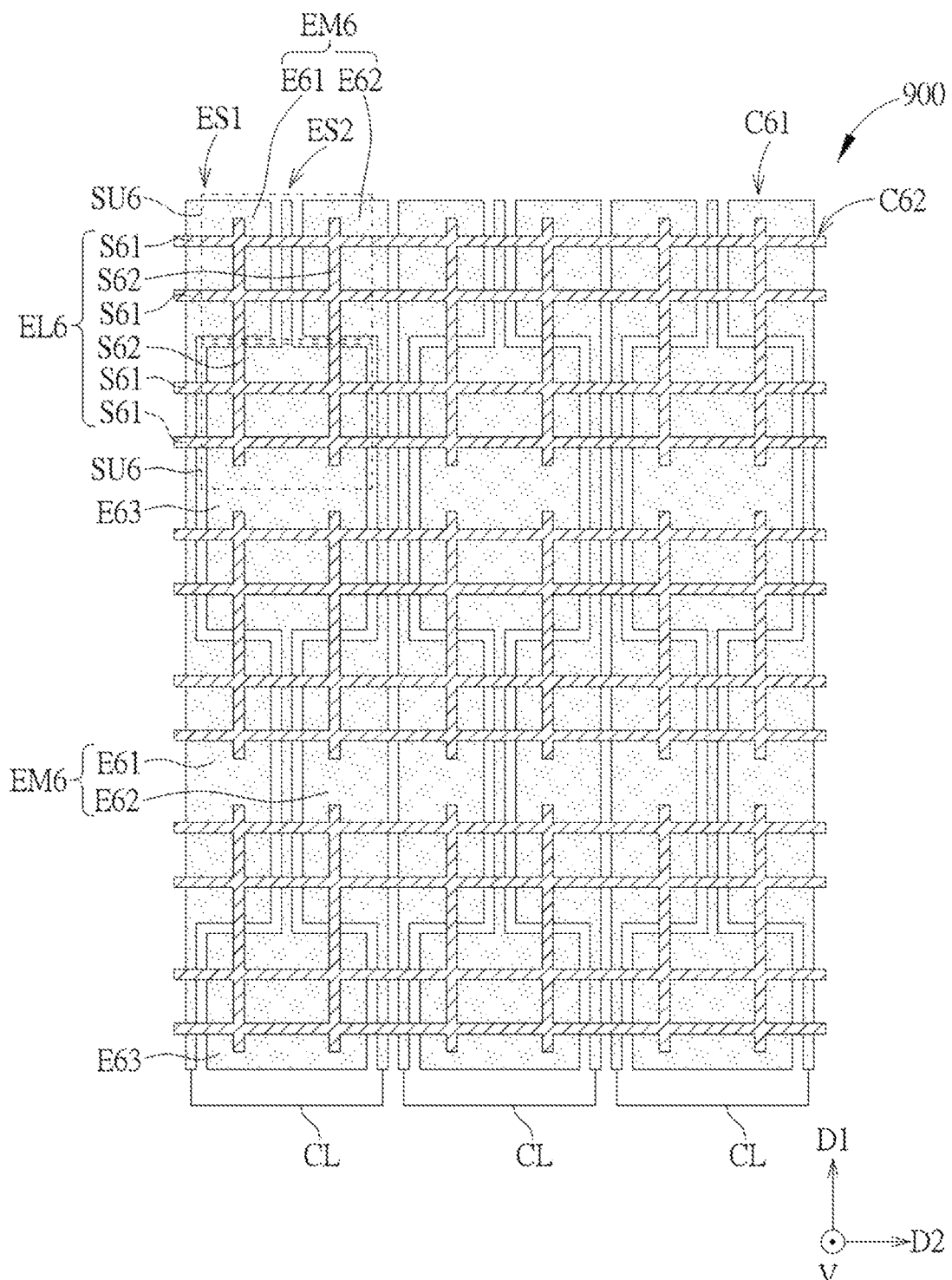
FIG. 10 is a schematic top view of a mutual capacitive touch panel according to a ninth embodiment of the invention.

Referring to FIG. 10, it is a schematic top view of a mutual capacitive touch panel according to a ninth embodiment of the invention. A mutual capacitive touch panel 900 provided by the present embodiment is different from that of the seventh embodiment illustrated in FIG. 8 in that each electrode strip EL6 of the present embodiment is not a meandering electrode strip. In addition, each electrode set EM6 and each third electrode E63 of the present embodiment are different from those of the seventh embodiment in that each electrode set EM6 and each third electrode E63 have no openings, and thus, the arrangement relation will not be repeated, but the invention is not limited thereto. Specifically, each electrode strip EL6 includes four first strip portions S61 and a plurality of second strip portions S62. Each first strip portion S61 extends along the second direction D2, two of the first strip portions S61 cross one of electrode sets EM6 of each first electrode series ES1, and another two of the first strip portions S61 cross one of third electrodes E63 of each second electrode series ES2. Each second strip portion S62 of each strip portion EL6 extends along the first direction D1 and crosses the first strip portions S61, and two adjacent second strip portions S62 correspond to one of the first electrode series ES1 and one of the second electrode series ES2 and overlap one of the electrode sets EM6 and one of the third electrodes E63. In the present embodiment, each electrode set EM6 of the first row may be coupled to two adjacent first strip portions S61 and two adjacent second strip portions S62 of the corresponding electrode strip EL6 to form a sensing unit SU6, each third electrode E63 of the last row may be coupled to two adjacent first strip portions S61 and two adjacent second strip portions S62 of the corresponding electrode strip EL6 to form a sensing unit SU6, each electrode set EM6 of the other rows may be coupled to two adjacent first strip portions S61 and two adjacent second strip portions S62 of one of two adjacent electrode strips EL6 and coupled to two adjacent first strip portions S61 and two adjacent second strip portions S62 of the other one of the two adjacent electrode strips EL6 to form two sensing units SU6, and each third electrode E63 of the other rows may be coupled to two adjacent first strip portions S61 and two adjacent second strip portions S62 of one of two adjacent electrode strips EL6 and coupled to two adjacent first strip portions S61 and two adjacent second strip portions S62 of the other one of the two adjacent electrode strips EL6 to form two sensing units SU6.

It is to be mentioned that since the meandering electrode strips extend meanderingly along the second direction D2, an impedance difference between the sensing units adjacent to two ends of the meandering electrode strip becomes overly large, which may lead to an overly large difference between the sensing signals, and an issue of sensing signals being mistakenly determined may occur. However, the present embodiment may achieve the reduction of the impedance difference between the sensing units at two ends of each electrode strip EL6 due to the first strip portions S61 that are design in a non-meandering shape, thereby preventing the sensing signals from being mistakenly determined. The stack structure of a first electrode layer C61, an insulation layer and a second electrode layer C62 may be applied to any one of the first embodiment illustrated in FIG. 2, the second embodiment illustrated in FIG. 3 and the third embodiment illustrated in FIG. 4. In another embodiment, the first electrode layer C61 illustrated in FIG. 10 may also be replaced by the first electrode layer C41 having the openings illustrated in FIG. 8 or the first electrode layer C51 having the openings illustrated in FIG. 9.

Figure 11:
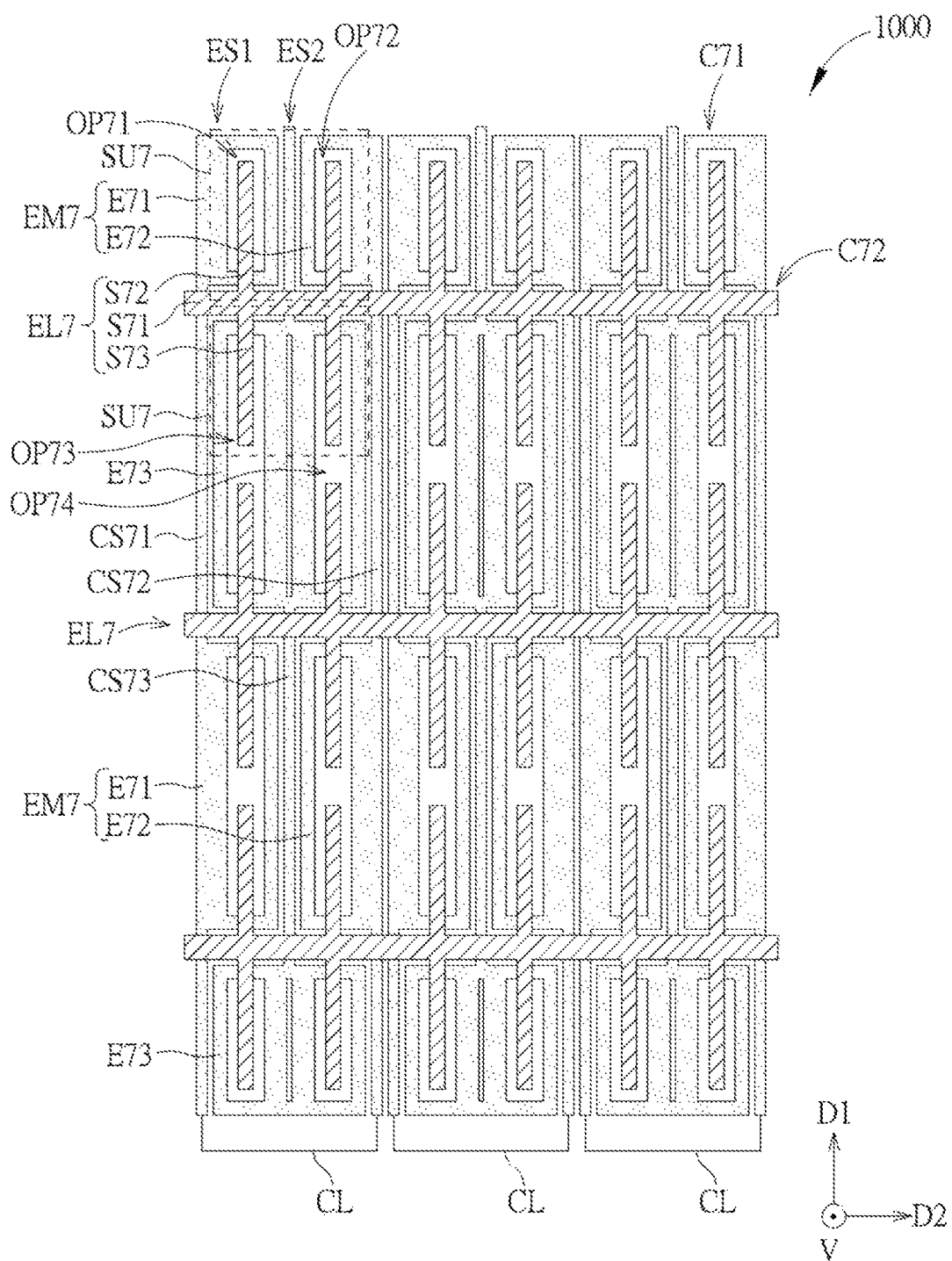
FIG. 11 is a schematic top view of a mutual capacitive touch panel according to a tenth embodiment of the invention.

Referring to FIG. 11, it is a schematic top view of a mutual capacitive touch panel according to a tenth embodiment of the invention. A mutual capacitive touch panel 1000 provided by the present embodiment is different from that of the ninth embodiment illustrated in FIG. 10 in that each electrode strip EL7 of a second electrode layer C72 of the present embodiment includes a main portion S71, a plurality of first branch portions S72 and a plurality of second branch portions S73. Specifically, each main portion S71 has a strip shape, extends along the first direction D1 and is located between one of electrode sets EM7 and one of third electrodes E73 that are adjacent to each other, such that each main portion S71 does not overlap the electrode sets EM7 and the third electrodes E73 in the vertical projection direction V. That is to say, a gap in which the main portion S71 is disposed between the adjacent electrode set EM7 and third electrode E73 is greater than the width of each main portion S71 in the first direction D1, thereby reducing a coupling capacitance between each main portion S71 and each electrode set EM7 and between each main portion S71 and each third electrode E73. Each main portion S71 crosses a first connecting line segment CS71 and a second connecting line segment CS72 of each first electrode series ES1 and a third connecting line segment CS73 of each second electrode series ES2. For instance, the width of each main portion S71 in the first direction D1 may be greater than the width of each first connecting line segment CS71 in the second direction D2, the width of each second connecting line segment CS72 in the second direction D2 and the width of each third connecting line segment CS73 in the second direction D2.

Each first branch portion S72 and each second branch portion S73 respectively extend out from two opposite sides of each main portion S71. Two adjacent first branch portions S72 respectively overlap the first electrode E71 and the second electrode E72 of one of the electrode sets EM7, and two adjacent second branch portions S73 overlap one of the third electrodes E73. In the present embodiment, each first branch portion S72 may be symmetrical to the corresponding second branch portion S73 in the second direction S2, such that two adjacent sensing units SU7 of the same column may be structurally mirror-symmetrical to each other to improve the touch accuracy. In addition, in the present embodiment, each electrode set EM7 of the first row may be coupled to a part of the main portion S71 and its two adjacent first branch portions S72 of the corresponding electrode strip EL7 to form a sensing unit SU7, each third electrode E73 of the last row may be coupled to a part of the main portion S71 and its two adjacent second branch portions S73 of the corresponding electrode strip EL7 to form a sensing unit SU7, each electrode set EM7 of the other rows may be coupled to a part of the main portion S71 and its two adjacent first branch portions S72 of one of two adjacent electrode strips EL7 and a part of the main portion S71 and its two adjacent second branch portions S73 of the other one of the two adjacent electrode strips EL7 to form two sensing units SU7, and each third electrode E73 of the other rows may be coupled to a part of the main portion S71 and its two adjacent second branch portion S73 of one of two adjacent electrode strips EL7 and a part of the main portion S71 and its two adjacent first branch portions S72 of the other one of the two adjacent electrode strips EL7 to form two sensing units SU7.

Compared to the first electrode layer illustrated in FIG. 10, in the first electrode layer C71 of the present embodiment, each first electrode E71 includes a first opening OP71, each second electrode E72 includes a second opening OP72, and each third electrode E73 includes a third opening OP73 and a fourth opening OP74 which are disposed abreast in the second direction D2. Each first opening OP71 and each third opening OP73 are arranged alternately along the first direction D1, and each second opening OP72 and each fourth opening OP74 are arranged alternately along the first direction D1. In the present embodiment, widths of each first opening OP71 and each second opening OP72 of the first row in the first direction D1 are smaller than widths of each first opening OP71 and each second opening OP72 of the other rows in the first direction D1, such that each first opening OP71 of the first row overlaps a corresponding one of the first branch portions S72 in the vertical projection direction V, each second opening OP72 of the first row overlaps a corresponding one of the first branch portions S72 in the vertical projection direction V, each first opening OP71 of the other rows overlaps one of the first branch portions S72 and one of the second branch portions S73 of two adjacent electrode strips EL7 in the vertical projection direction V, and each second opening OP72 of the other rows overlaps one of the first branch portions S72 and one of the second branch portions S73 of two adjacent electrode strips EL7 in the vertical projection direction V. In addition, widths of each third opening OP73 and each fourth opening O74 of the last row in the first direction D1 are also smaller than widths of each third opening OP73 and each fourth opening OP74 of the other rows in the first direction D1, such that each third opening OP73 of the last row overlaps a corresponding one of the second branch portions S72 in the vertical projection direction V, each fourth opening OP74 of the last row overlaps a corresponding one of the second branch portions S72 in the vertical projection direction V, each third opening OP73 of the other rows overlaps one of the first branch portions S72 and one of the second branch portions S73 of two adjacent electrode strips EL7 in the vertical projection direction V, and each fourth opening OP74 of the other rows overlaps one of the first branch portions S72 and one of the second branch portions S73 of two adjacent electrode strips EL7 in the vertical projection direction V.

Figure 1:
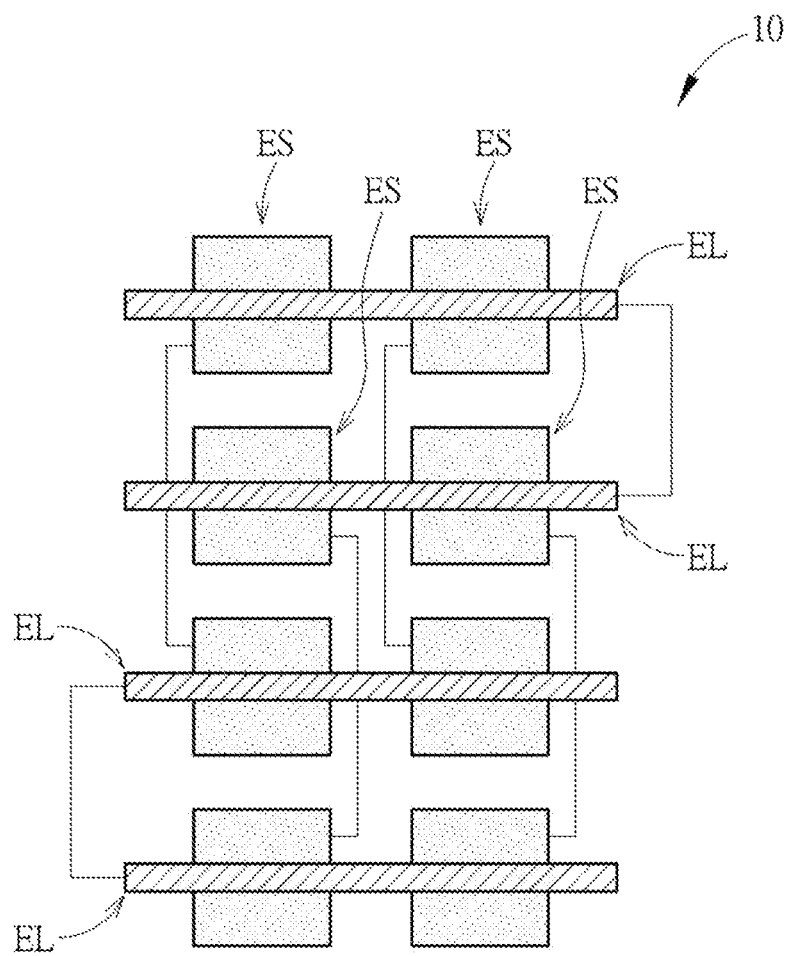
FIG. 1 is a schematic top view of a dual-layer electrode structured touch panel with narrow peripheral areas of the related art.

It is to be mentioned that even though the mutual capacitive touch panel illustrated in FIG. 10 may improve the issue of the overly large impedance difference between the sensing units at two ends of each meandering electrode strip, the first strip portions extending along the second direction D2 have to cross the electrode sets or the third electrodes, such that a great coupling capacitance still exists between each electrode strip and the first electrode series and between each electrode strip and the second electrode series and is incapable of being further reduced, which may lead to a high background capacitance. However, in the present embodiment, each main portion S71 has a strip shape and is disposed in a gap between each electrode set SM7 and each third electrode E73 which are adjacent to each other, and each first branch portion E72 and each second branch portion S73 may respectively overlap one of the corresponding first opening OP71, second opening OP72, third opening OP73 and fourth opening OP74. Thus, not only the issue of the large impedance difference existing between the sensing units SU7 of two ends of each electrode strip EL7 may be reduced, but also the coupling capacitance between each electrode strip EL7 and the first electrode series ES1 and between each electrode strip EL7 and the second electrode series ES2 may be reduced, so as to reduce the background capacitance of each sensing unit SU7 of the mutual capacitive touch panel 1000 and further reduce a feedback capacitance of an amplifier. The stack structure of the first electrode layer C71, the insulation layer and the second electrode layer C72 may be applied to any one of the first embodiment illustrated in FIG. 2, the second embodiment illustrated in FIG. 3 and the third embodiment illustrated in FIG. 4. Specially, when the structures of the first electrode layer C71 and the second electrode layer C72 illustrated in FIG. 11 are applied to the stack structure illustrated in FIG. 2, the background capacitance of each sensing unit may be reduced down to 3.13 picofarads (pF), for example. By being compared with the background capacitance of about 4.5 pF of the conventional sensing unit illustrated in FIG. 1, the design of the first electrode layer C71 and the second electrode layer C72 of the present embodiment, in a condition that the insulation layer is reduced, may effectively achieve reducing the background capacitance of each sensing unit SU7.

Based on the above, in the mutual capacitive touch panel of the invention, since the meandering electrode strips avoid the first connecting line segments and the second connecting line segments, not only the touch accuracy can be prevented from being reduced as the coupling capacitance between the meandering electrode strips and the first and the second connecting line segments is reduced, but also the background capacitance of each sensing unit can be reduced, so as to improve touch sensing quality. And, with the abreast disposition of each first electrode and each second electrode and the arrangement that each third connecting line segment connecting the third electrodes is arranged between each first electrode and each second electrode which are disposed abreast, each meandering electrode strip can be prevented from extending to between the first connecting line segments and the second connecting line segments of two adjacent ones of the first electrode series, thereby reducing a spacing between two adjacent first electrode series. Furthermore, with the disposition of each electrode strip in a gap between each electrode set and each third electrode which are adjacent to each other, not only each electrode strip can be designed in a strip shape to reduce the impedance difference between two ends of each electrode strip and prevent sensing signals from being mistakenly determined, but also the coupling capacitance between each electrode strip and each electrode set and between each electrode strip and each third electrode can be reduced, thereby reducing the background capacitance of the mutual capacitive touch panel.

The embodiments described hereinbefore are chosen and described in order to best explain the principles of the invention and its best mode practical application. It is not intended to be exhaustive to limit the invention to the precise form or to the exemplary embodiments disclosed. Namely, persons skilled in the art are enabled to understand the invention through various embodiments with various modifications as are suited to the particular use or implementation contemplated. It is intended that the scope of the invention be defined by the claims appended hereto and their equivalents in which all terms are meant in their broadest reasonable sense unless otherwise indicated.

What is claimed is:

1. A mutual capacitive touch panel, comprising:
   a first electrode layer, comprising a plurality of first electrode series and a plurality of second electrode series respectively extending along a first direction, and each of the first electrode series corresponding to one of the second electrode series;
   a second electrode layer, disposed above the first electrode layer and comprising a plurality of electrode strips respectively extending along a second direction, and each of the electrode strips crossing the first electrode series and the second electrode series; and
   an insulation layer, disposed between the first electrode layer and the second electrode layer,
   wherein each of the first electrode series comprises a plurality of first electrodes and a plurality of second electrodes, and in each of the first electrode series, each of the first electrodes is electrically connected to each of the second electrodes, and each of the first electrodes and a corresponding one of the second electrodes are disposed abreast along the second direction and form an electrode set,
   wherein each of the second electrode series comprises a plurality of third electrodes electrically connected with each other, each of the electrode sets and each of the third electrodes are arranged alternately along the first direction, and each of the electrode strips overlaps one of the electrode sets and one of the third electrodes that are adjacent to each other,
   wherein each of the first electrode series further comprises a plurality of first connecting line segments and a plurality of second connecting line segments, wherein in each of the first electrode series, the first electrodes are connected with each other via the first connecting line segments, and the second electrodes are connected with each other via the second connecting line segments, and wherein each of the first connecting line segments and the second connecting line segments extends along the first direction, wherein each of the second electrode series further comprises a plurality of third connecting line segments, wherein in each of the second electrode series, the third electrodes are connected with each other via the third connecting line segments, and wherein each of the third connecting line segments extends along the first direction.

2. The mutual capacitive touch panel as recited in claim 1, wherein first connecting line segments and the second connecting line segments of each of the first electrode series are respectively disposed at two opposite sides of a corresponding one of the second electrode series.

3. The mutual capacitive touch panel as recited in claim 1, wherein each of the third connecting line segments is disposed between one of the first electrodes and one of the second electrodes that are adjacent to each other.

4. The mutual capacitive touch panel as recited in claim 1, wherein each of the first electrode series further comprises a connecting line configured to electrically connecting the first electrodes and the second electrodes, and the connecting line is disposed at an end of a corresponding one of the second electrode series.

5. The mutual capacitive touch panel as recited in claim 1, wherein each of the electrode strips comprises a main portion, a plurality of first branch portions and a plurality of second branch portions, each of the main portions extends along the first direction and located between one of the electrode sets and one of the third electrodes that are adjacent to each other, each of the first branch portions and each of the second branch portions respectively extend out from two opposite sides of each of the main portions, two adjacent ones of the first branch portions respectively overlap the first electrode and the second electrode of one of the electrode sets, and two adjacent ones of the second branch portions respectively overlap one of the third electrodes.

6. The mutual capacitive touch panel as recited in claim 5, wherein each of the first electrodes comprises a first opening, each of the second electrodes comprises a second opening, each of the third electrodes comprises a third opening and a fourth opening disposed abreast in the second direction, two adjacent ones of the first branch portions respectively overlap the first opening of a corresponding one of the first electrodes and the second opening of a corresponding one of the second electrodes, and two adjacent ones of the second branch portions respectively overlap the third opening and the fourth opening of a corresponding one of the third electrodes.

7. The mutual capacitive touch panel as recited in claim 1, wherein each of the electrode strips comprises four first strip portions and a plurality of second strip portions, each of the first strip portions extends along the second direction, two of the first strip portions cross one of the electrode sets of each of the first electrode series, another two of the first strip portions cross one of the third electrodes of each of the second electrode series, each of the second strip portions extends along the first direction and crosses the first strip portions, and two adjacent ones of the second strip portions overlap one of the electrode sets and one of the third electrodes.

8. The mutual capacitive touch panel as recited in claim 1, wherein each of the electrode strips extends meanderingly along the second direction, such that each of the electrode strips does not overlap the first connecting line segments, the second connecting line segments and the third connecting line segments in the vertical projection direction.

9. The mutual capacitive touch panel as recited in claim 8, wherein two adjacent ones of the electrode strips overlap a same one of the third electrodes of each of the second electrode series and are symmetrical to each other with respect to the second direction.

10. The mutual capacitive touch panel as recited in claim 1, wherein each of the first electrodes comprises a first opening, each of the second electrodes comprises a second opening, each of the third electrodes comprises a third opening and a fourth opening disposed abreast in the second direction, each of the first openings and each of the third openings are arranged alternately along the first direction, and each of the second openings and each of the fourth openings are arranged alternately along the first direction.

11. The mutual capacitive touch panel as recited in claim 1, wherein the electrode sets and the third electrodes are arranged in an array, the electrode sets are located in odd rows, the third electrodes are located in even rows, the first electrode of each of the electrode sets of a non-first row comprises two first openings, the second electrode of each of the electrode sets of the non-first row comprises two second openings, each of the third electrodes of a non-last row comprises two third openings and two fourth openings, each two of the first openings and each two of the third openings are arranged alternately along the first direction, and each two of the second openings and each two of the fourth openings are arranged alternately along the first direction.

12. The mutual capacitive touch panel as recited in claim 1, wherein the insulation layer is formed of an insulating material comprising silicon oxide or silicon nitride and has a thickness ranging between 1.2 μm and 30 μm.

13. The mutual capacitive touch panel as recited in claim 1, wherein the insulation layer comprises an adhesive layer and a substrate, a thickness of the adhesive layer is substantially 20 μm, and a thickness of the substrate is substantially 25 μm.

14. The mutual capacitive touch panel as recited in claim 1, wherein the insulation layer is a substrate, and the first electrode layer and the second electrode layer are respectively formed on a top surface and a bottom surface of the substrate.

15. A mutual capacitive touch panel, comprising:
a first electrode layer, comprising a plurality of first electrode series and a plurality of second electrode series respectively extending along a first direction, and each of the first electrode series corresponding to one of the second electrode series, wherein each of the first electrode series comprises a plurality of first electrodes and a plurality of first connecting line segments, the first electrodes are electrically connected with each other via the first connecting line segments, each of the second electrode series comprises a plurality of second electrodes and a plurality of second connecting line segments, the second electrodes are electrically connected with each other via the second connecting line segments, the first electrodes and the second electrodes are arranged in an array, and each of the first electrodes of one of the first electrode series and each of the second electrodes of a corresponding one of the second electrode series are arranged alternately along the first direction, and wherein each of the first connecting line segments and the second connecting line segments extends along the first direction;
a second electrode layer, disposed above the first electrode layer and comprising a plurality of meandering electrode strips respectively extending along a second direction, wherein each of the meandering electrode strips crosses the first electrode series and the second electrode series, and each of the meandering electrode strips overlaps the first electrodes and the second electrodes of two adjacent rows in a vertical projection direction; and an insulation layer, disposed between the first electrode layer and the second electrode layer.

16. The mutual capacitive touch panel as recited in claim 15, wherein the meandering electrode strips do not overlap the first connecting line segments and the second connecting line segments in the vertical projection direction.

17. The mutual capacitive touch panel as recited in claim 15, wherein a width of each of the first electrodes in the second direction and a width of each of the second electrodes in the second direction are the same.

18. The mutual capacitive touch panel as recited in claim 15, wherein two adjacent ones of the meandering electrode strips overlap a same one of the first electrodes of each of the first electrode series and are symmetrical to each other with respect to the second direction.

19. The mutual capacitive touch panel as recited in claim 15, wherein each of the first electrodes comprises a first opening, and each of the second electrodes comprises a second opening.

* * * * *